April 9, 1968 G. RINALDI ET AL 3,376,693
PROCESS FOR THE RECOVERY OF ACETYLENE FROM
GASEOUS MIXTURES CONTAINING SAME
Filed May 23, 1966

INVENTOR.
G. RINALDI
E. MARIANI
G. COSTAGUTA
BY Karl F. Ross
Attorney

United States Patent Office 3,376,693
Patented Apr. 9, 1968

3,376,693
PROCESS FOR THE RECOVERY OF ACETYLENE FROM GASEOUS MIXTURES CONTAINING SAME
Gianfranco Rinaldi, Eduardo Mariani, and Giancarlo Costaguta, Maino, Italy, assignors to Montecatini Edison S.p.A., Milan, Italy
Filed May 23, 1966, Ser. No. 552,041
Claims priority, application Italy, May 29, 1965, 12,000/65
2 Claims. (Cl. 55—65)

ABSTRACT OF THE DISCLOSURE

A process for the recovery of acetylene from a petroleum-cracking gas containing ethylene and carbon dioxide in addition to acetylene wherein the gas is initially treated with a primary solvent in which the acetylene is preferentially soluble to dissolve it and some of the ethylene and carbon dioxide; thereafter an acetylene-containing gas recycled from the stripping stage is passed countercurrent to the primary solvent and displaces the ethylene and carbon dioxide which is returned to the degassing tower of the primary solvent at a point therealong at which the molar ratio of acetylene to the carbon dioxide/ethylene component in this tower is the same as that of the returned gas.

---

Figure 1:
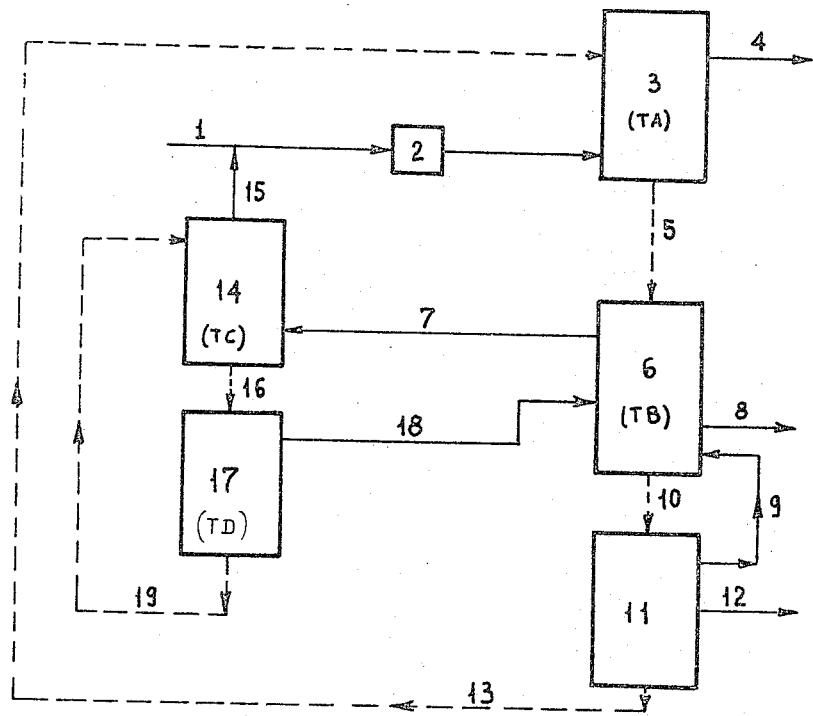

Our present invention relates to a process for the recovery and separation of acetylene from gaseous mixtures containing same (e.g. mixtures of the type obtained by the cracking of hydrocarbons such as methane) and, more particularly, to an improved process and apparatus for obtaining acetylene in a relatively pure state by solvent extraction.

More specifically, the invention relates to improvements capable of increasing the capacity of solvent-extraction plants for the purification and recovery of acetylene from a gaseous mixture containing acetylene and other petroleum or hydrocarbon cracking residues and products by treating the gas mixture with an acetylene-specific solvent in which acetylene gas is preferentially soluble.

Such techniques have also been employed with other gas mixtures for the recovery of acetylene with high purity and it will be understood that reference hereinafter to a "cracking" gas as a source of acetylene is intended to only exemplificative.

The crude gases containing acetylene and produced by the cracking of hydrocarbons and by other systems for generating gas mixtures from which acetylene can be recovered usually produce gases rich in acetylene and carbon dioxide, carbon monoxide, ethylene, methane, small quantities of acetylenically unsaturated higher molecular weight compounds hereinafter referred to as "higher acetylenes," aromatic hydrocarbons, etc. regardless of the nature of the cracking process or the hydrocarbon treated. When it is desired to recover acetylene from such mixtures, it must be recognized that this component, although present in substantial proportion, is diluted and contaminated by a number of compounds from which it must be separated with high yields in order for the process to be economically advantageous and in such manner that the acetylene is recovered in a substantially pure state so that it can be used directly in chemical synthesis for which it is primarily intended, or for whatever other purpose it may be desired.

Conventional methods of recovering acetylene from gas mixtures of the character described have provided for the selective-solvent extraction of the gas mixture by solvents in which the acetylene is preferentially soluble. Thus, the cracking gas may be cooled and freed of certain undesirable components (especially carbon black and naphtalenic or other polynuclear aromatics), and washed in an absorption tower with a selective solvent. The solvent containing the acetylene is then degased to release the acetylene while the solvent is recirculated to the washing tower to repeat the process; insoluble gases pass from the washing tower. It is common practice, moreover, to compress the gas mixture, after separation of the carbon black and polynuclear aromatic compounds thereafter, to increase the partial pressure of the acetylene in the mixture and thereby promote its dissolution in the solvent. The compressed gas flows countercurrent to the solvent which, in addition to extracting most if not all of the acetylene from the gas mixture, also dissolves the higher acetylenes, carbon dioxide and ethylene, while the residual gas, now nearly lacking acetylene, escapes from the top of the tower and is thus eliminated.

The acetylene solution in the solvent is decomposed and fed in a successive degassing tower (referred thereafter as TB) where it meets in countercurrent an acetylene gaseous flow, nearly pure, coming from a successive phase of the process which eliminates from the solvent the other components less soluble than the acetylene, principally $CO_2$ and ethylene. In the degassing tower the acetylene stream tends, in fact, to drive the carbon dioxide and ethylene out of solution so that, when the acetylene is stripped from the solvent at a subsequent stage, it is recovered in a highly pure state.

From the top of the degassing tower, therefore, one obtains a gas stream consisting primarily of acetylene but containing large proportions of contaminants (i.e. carbon dioxide and ethylene) which are less soluble than acetylene in the solvent; the acetylene of this gas stream must be recovered if the process is to be economical and is, consequently, recycled to the compression stage and admixed with the crude-gas mixture or "cracking" gas with which it is returned to the absorption tower. The acetylene content of this recycled gas stream must be high in order to ensure a substantially complete elimination of the carbon dioxide and ethylene from the solvent in the degassing stage and, therefore, the obtention of acetylene of the desired high purity and quality. In conventional processes, this recycled gas stream is diluted with the crude gas and cannot be economically exploited although it is imperative that the recycled gas contain a high concentration of acetylene, the component of principal interest for the purposes of the present invention.

After this recycled gas stream has stripped the carbon dioxide and ethylene from the solvent, the latter, saturated substantially only with acetylene, is heated at reduced pressure to release the acetylene, part of which is used directly or upon further purification (although the acetylene obtained has a satisfactory purity for chemical synthesis and most other applications), while another part of the acetylene serves as the stripping gas and constitutes the recycled gas stream. The higher acetylenes, which are discharged from the solvent in this stage, may be carried off with the acetylene streams or separated independently.

The capacity of the plants for recovering of the acetylene by solvent extraction depends, for a given tower height, diameter and type of packing, upon the quantity and temperature of the solvent delivered to the absorption tower, the partial pressure of the acetylene emerging from the compression and fed into the absorption tower, the quantity, temperature and composition of the crude-gas mixture and the acetylene content of the gas emerging from the top of the degasification tower and the carbon dioxide content permissible in the acetylene diverted from the plant for subsequent use. Some of these factors are substantially constant under most conditions while others are interdependent and may vary within characteristic ranges with limits imposed by the dimensions and nature of the apparatus, the environmental conditions of safety criteria and the economics of the operation.

It is, therefore, the principal object of the present invention to provide a process for the recovery of acetylene from gaseous mixtures containing same and particularly from gaseous mixtures in which the acetylene is accompanied by carbon dioxide and/or ethylene, in which the capacity of existing absorption tower and degasification tower arrangements are used.

A further object of this invention is to provide a process for increasing the capacity of plants for the separation, recovery and purification of acetylene operating with selective solvents and wherein it is not possible and/or convenient to increase the quantity or reduce the temperature of the solvent entering the absorption tower.

A further object of our present invention is to provide an improved installation for the solvent extraction and recovery of acetylene from gas mixtures also containing carbon dioxide and/or ethylene which permits a high output of acetylene of high purity to be obtained for given dimensions of the absorption tower and degasification tower and for given quantities of solvent and solvent temperatures.

It has now been discovered that the foregoing objects can be attained, surprisingly, by an improved method wherein the recycling gas used for stripping the carbon dioxide and/or ethylene from the solvent prior to the separation of acetylene therefrom is subjected to a solvent extraction designed to reduce the acetylene proportion in this recycling gas, and this recycling or stripping gas is subsequently returned to the absorption tower or discharged, the recovered or secondary gas mixture (after separation from the secondary solvent-extraction stage) being delivered to the degasification tower at a location therealong at which the molar ratio of acetylene to the total molar quantity of ethylene and carbon dioxide is substantially equal to the corresponding ratio of the extracted gas mixture.

Thus, according to this invention, an aetylene-containing gas (e.g. a cracking gas as previously described) containing acetylene in addition to carbon dioxide and/or ethylene, is passed through a primary absorption tower countercurrent to a solvent for acetylene which absorbs the acetylene from the gas mixture but also absorbs part of the less soluble carbon dioxide/ethylene component; thereafter, the solvent containing a major proportion of acetylene together with dissolved carbon dioxide and/or ethylene is fed to the primary degasification tower at least part of which sustains a stripping operation wherein the gas-containing solvent is passed countercurrent to a stripping gas primarily composed of acetylene and adapted to extract the carbon dioxide and/or ethylene from the solvent and to saturate the latter with acetylene, the solvent being thereafter heated or otherwise degassed (advantageously at reduced pressure) to yield acetylene. Part of this gas may be diverted for use while the balance forms the stripping gas mentioned above. The improvement of the present invention resides in the steps of treating the stripping gas, after it has passed through the primary degasification tower, in a secondary absorption tower by passing it countercurrent to a liquid solvent for acetylene and thereafter degassing the secondary solvent to produce a gas mixture containing an acetylene component and a carbon dioxide/ethylene component in a determinable molar ratio, this secondary gas being returned to the primary degassing tower at a location at which the molar ratio of acetylene to the carbon dioxide/ethylene component in this primary degassing tower is identical to that of the secondary gas.

It has been found that the improved process of the present invention does not alter the effectiveness of the primary degassing tower inasmuch as the indicated relationship of molar ratio is observed so that the secondary gas mixture merely increases the volume of gas being treated and partially substitutes or replaces the gas stream rising in this degasing tower as the stripping gas. The stripping gas, after treatment with the secondary solvent in the secondary adsorption tower, contains a relatively low proportion of acetylene and may be discharged from the system or, if desirable, recycled to the primary adsorption tower by mixing it with the crude gas upstream of the primary adsorption tower and preferably upstream of the compressor.

As a practical matter, it has been found that the improved method of the present invention provides a considerable increase in the capacity of a plant for the solvent extraction of acetylene (in terms of the volume of crude gas processed) without major increase in capital expenditure and without materially interfering with the efficiency, structure or manner of operation of the adsorption tower and degassing tower aggregate. The improved method acts only upon the "recycling gas" and does not vary materially the composition of the gas entering the primary adsorption tower; the composition of this gas, as has been indicated, depends upon the relative quantities and compositions of the gases coming from the cracking burners and having a low acetylene content which is merely constant, and the recycling gas. Since the quantity of acetylene contained in the latter gas is reduced, in accordance with this invention, an increased proportion of the cracking gas can be fed to the system and the overall efficiency of the plant is increased thereby.

Figure 2:
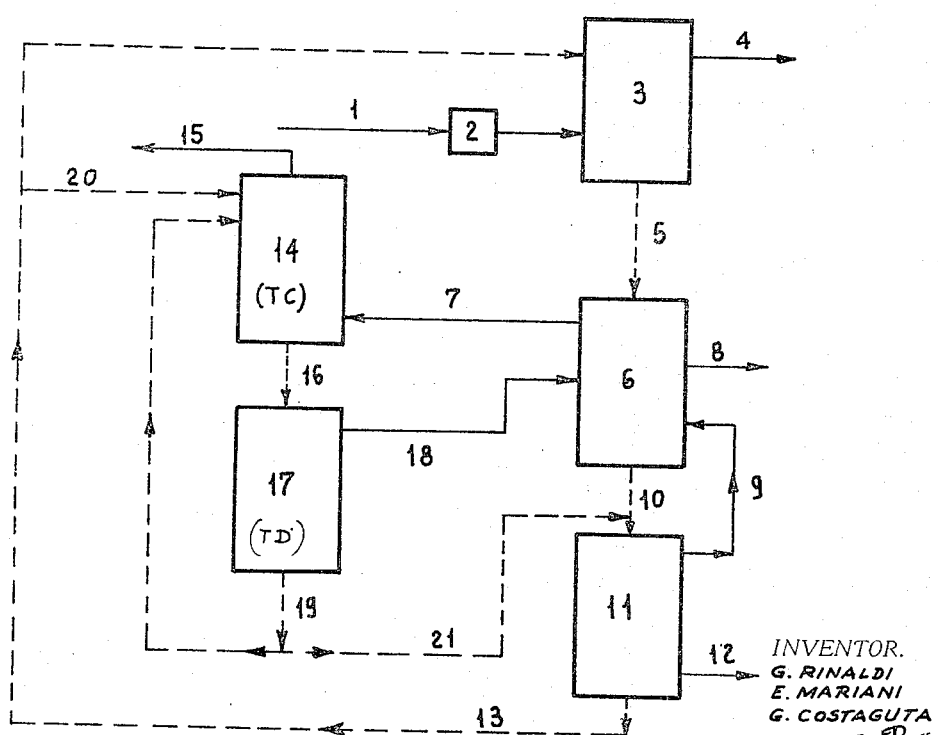

The above and other objects, features and advantages will become more readily apparent from the following description and specific examples, reference being made to the accompanying drawing in which:

FIG. 1 is a flow diagram of an acetylene-recovery plant, in accordance with the present invention, wherein the stripping gas, after solvent extraction, is returned to the primary adsorption tower and in which the secondary extraction is effected in a solvent cycle distinct from that of the primary extraction; and FIG. 2 is a flow diagram of a modified plant in which the primary and the secondary extraction steps are part of a common solvent cycle and the stripping gas, subsequent to secondary extraction, is discharged.

Referring now to FIG. 1, it will be seen that the cracking gases containing acetylene ($C_2H_2$), ethylene ($C_2H_4$) and carbon dioxide ($CO_2$) in addition to the other components usually present in the cracking gas are supplied at 1 to a compressor 2 in which the crude gas is compressed to increase the acetylene partial pressure to a level generally not greater than 1.4 atm. (for safety reasons). The compressed crude gases enter a lower portion of the primary absorption tower 3 (TA) through which they pass countercurrent, in accordance with conventional techniques, to a solvent in which acetylene is preferentially soluble. The solvent is delivered to an upper portion of the absorption tower 3 via a line 13, while the cracking gases, substantially free from acetylene and the less soluble components usually associated therewith (namely carbon dioxide and ethylene) are discharged at 4. The absorption tower 3 thus constitutes a primary absorption stage, in accordance with the present invention, the solvent of which is decompressed after passing at 5 from the bottom of the absorption tower 3. The decompressed solvent is fed to the top of the primary-stage degassing tower 6. In the degassing tower 6 (TB) the solvent, containing acetylene together with carbon dioxide and ethylene in addition to traces of oxygen, hydrogen, methane, higher acetylenes (e.g. allene, propyne, mono and divinyl acetylene and diacetylene), is passed countercurrent to a stream of acetylene, in a relatively pure state, supplied at 9 and constituting the stripping gas. The acetylene extracts the carbon dioxide and ethylene component from the solvent in the degassing tower 6 so that the solvent withdrawn from the bottom of this primary degassing tower at 10 is saturated substantially only with acetylene and enters a desorption chamber 11 in which the acetylene is stripped from the solvent in a conventional manner at elevated temperature and reduced pressure. A high-purity acetylene is thus produced and delivered via line 9 to the primary stripping tower 6 while higher acetylenes are eliminated as represented by the line 12. The pure acetylene is withdrawn from the system at 8. The solvent freed from its gases is returned via line 13 to the primary absorption tower.

In accordance with the principles of this invention, the stripping gases are led from the primary degassing tower 6 via a line 7 to the bottom of a secondary absorption tower (TC) 14 in which these gases pass countercurrent to a solvent stream fed to this tower via a line 19. The gas delivered to the secondary absorption tower 14 via line 7 usually contains from 60–90% by volume acetylene with the balance carbon dioxide and ethylene together with minor quantities of hydrogen, methane and allene.

Within the secondary absorption chamber 14, a solvent from line 19 passes countercurrent to the stripping gas stream, substantially completely removing the acetylene from the stripping gas along with a part of the carbon dioxide and/or ethylene; the solvent is then passed at 16 from the bottom of the tower into a secondary degassing tower (TD) 17. A relatively high temperature is maintained in the latter which serves to completely remove the gas entrapped in the solvent to produce a secondary gas mixture which is led at 18 to the primary degassing chamber 16. The solvent, after cooling, is led from the bottom of chamber 17 and returned via line 19 to the top of the secondary absorption tower 14. From the top of this tower, moreover, the stripping gas freed from acetylene and other components soluble in the solvent is returned to the incoming line 1 from the crude gas and thus the residual stripping gas is admixed with the crude gas in the usual manner. As previously noted, the secondary gas mixture at line 18 contains acetylene, carbon dioxide and ethylene in a characteristic proportion so that the molar ratio of acetylene to the total of carbon dioxide and ethylene component $$\left(\text{i.e. the molar ratio } \frac{C_2H_2}{CO_2 + C_2H_4}\right)$$

can be determined. It is an essential and critical feature of this invention that the secondary gas stream from line 18 is supplied to the primary degassing tower 6 at a point between the discharge line 8 from which substantially pure acetylene is taken and the top of the tower and at which the molar ratio of acetylene to the carbon dioxide/ethylene component is substantially identical to that of the secondary gas mixture.

It is thus apparent that the washing of the stripping or "recycling" gas via the secondary towers 14 and 17 reduces the acetylene content in the stripping gas from its original value of 60–90% by volume to approximately 5% by volume and thus reduces substantially the quantity of acetylene that is delivered to the primary absorption tower and permits this tower to sustain a significant increase, all other working conditions remaining the same, in the amount or volume of flow rate of the cracking gas delivered to the primary absorption tower. A larger quantity of the crude gas may thus be treated at the expense of a decreased recycling volume without material capital investment or modification of the plant. The acetylene content in the top gas of the secondary absorption chamber may be varied at will by merely using towers of appropriate height so that the residual acetylene content in the stripping gas may be held less than 1%. In this gas, the stripping gas, after secondary-stage extraction, can be vented without recycling.

In FIG. 2, we show an arrangement in which such recycling can be avoided and in this embodiment corresponding numerals represent elements substantially identical to those described in connection with FIG. 1. By contrast with the system of FIG. 1, however, the solvent used for the secondary stage extraction of the stripping gas is drawn from the principal solvent circulation at 20 and fed, in an acetylene-free state, to the top of the secondary absorption tower 14. Via line 19, a secondary solvent cycle is established in the manner set forth in connection with FIG. 1 although, in order to avoid interference with the primary solvent balance, a part of the solvent withdrawn from the degassing chamber 17 is led at 21 to the line 10 communicating between the primary degassing chamber 6 and the gas-separating chamber 11. The line 15 is here vented when the acetylene content of the stripper gas after extraction is less than 1% as indicated. Otherwise the system of FIG. 2 functions in the manner described with respect to FIG. 1.

In the following tables relating to two different cracking gases, we show some actual examples of the operation of the present method which has been found to yield an increase in the capacity of the plant ranging from 20–30% depending upon the cracking gas composition and temperature of the solvent. In Examples I, II, and III, the temperature of the solvent entering the primary absorption tower 3 (N-methyl pyrrolidone) was 30° C. whereas in Examples I′, II′ and III′, the temperature of

TABLE 1

| Examples | I | II | III | I′ | II′ | III′ |
|---|---|---|---|---|---|---|
| Solvent temperature, TA inlet (° C.) | 30 | 30 | 30 | 10 | 10 | 10 |
| Gas colume TA inlet (m.³/hr. STP) | 1,050 | 1,240 | 1,220 | 1,490 | 1,811 | 1,800 |
| Gas temp. at TA inlet (° C.) | 40 | 40 | 40 | 40 | 40 | 40 |
| Partial press. $C_2H_2$ at TA inlet (kg./cm.²) | 1.13 | 1.1 | 1.1 | 1.11 | 1.1 | 1.1 |
| Acetylene content in gas at TA inlet (percent) | 10.6 | 8.26 | 8.3 | 10.4 | 8.28 | 8.3 |
| Quantity of $C_2H_4$ in gas at TA inlet (m.³/hr. STP) | 0.5 | 0.51 | 0.48 | 0.50 | 0.51 | 0.48 |
| Quantity of $CO_2$ (m.³/hr. STP) | 3.9 | 4.0 | 3.5 | 3.8 | 3.9 | 3.5 |
| Quantity of top gas of TB (m.³/hr. STP) | 36.2 | 52.5 | 52.5 | 46.5 | 64.0 | 64.0 |
| Acetylene content in head gas of TB (percent) | 75 | 75 | 75 | 75 | 75 | 75 |
| Top gas temperature (° C.) | 42.7 | 42.1 | 47 | 31.6 | 32.3 | 32.2 |
| Partial pressure of acetylene in TC inlet (kg./cm.²) | | 1.35 | 1.35 | | 1.35 | 1.35 |
| Quantity of top-gas in TC (m.³/hr. STP) | | 14 | 9.25 | | 11.4 | 9.25 |
| Acetylene content in the top gas TC (percent) | | 5 | 1 | | 5 | 1 |
| Top gas temperature (° C.) | | 30 | 30 | | 30 | 30 |
| Solvent temperature at TC inlet (° C.) | | 30 | 30 | | 30 | 30 |
| Gas flow from TD to TB (m.³/hr.) | | 42.8 | 43.25 | | 54.3 | 54.7 |
| $CO_2$+ethylene content in the gas passing from TD to TB (percent) | | 3.5 | 3.5 | | 3.5 | 3.5 |
| Gas temperature from TD to TB (° C.) | | 100 | 100 | | 100 | 100 |
| Top gas quantity at TA (m.³/hr. STP) | 930 | 1,120 | 1,090 | 1,320 | 1,650 | 1,610 |
| Top gas temperature of TA (° C.) | 30 | 30 | 30 | 10 | 10 | 10 |
| Acetylene in the top gas of TA (p.p.m.) | 150 | 103 | 100 | 56 | 81 | 80 |
| $CO_2$+ethylene content in the acetylene produced (percent) | 0.1 | 0.1 | 0.1 | 0.25 | 0.30 | 0.2 |
| Produced acetylene (m.³/hr. STP) | 83.9 | 101.2 | 101.2 | 119.9 | 149.2 | 149 |

TABLE 2

| Examples | 1 | 2 | 3 | 1' | 2' | 3' |
|---|---|---|---|---|---|---|
| Solvent temperature at TA inlet (° C.) | 30 | 30 | 30 | 10 | 10 | 10 |
| Gas quantity at the TA inlet (nmc./h.) | 740 | 921 | 907 | 1,000 | 1,240 | 1,221 |
| Gas temperature at TA inlet (° C.) | 40 | 40 | 40 | 40 | 40 | 40 |
| Partial pressure of acetylene in gas at TA inlet (kg./cmq.) | 1.1 | 1.1 | 1.1 | 1.1 | 1.1 | 1.1 |
| Acetylene content in gas at TA inlet (percent) | 17.2 | 13.6 | 13.7 | 17.2 | 13.6 | 13.7 |
| Quantity of $C_2H_4$ in gas at TA inlet | 13.9 | 14.4 | 13.7 | 13.9 | 14.4 | 13.7 |
| Quantity of $CO_2$ in gas at TA inlet | 1.78 | 1.9 | 1.73 | 1.78 | 1.9 | 1.73 |
| Quantity of top gas of TB (nmc./h.) | 42.4 | 56.3 | 56.3 | 58 | 76.3 | 76.3 |
| Acetylene content in head gas of TB (percent) | 75 | 75 | 75 | 75 | 75 | 75 |
| Top gas temperature (° C.) | 43.5 | 43.8 | 43.7 | 31.4 | 32.2 | 32.1 |
| Partial pressure of acetylene in TC inlet (kg./cmq.) | | 1.35 | 1.35 | | 1.35 | 1.35 |
| Quantity of top gas in TC (nmc./h.) | | 13.8 | 13.3 | | 18.6 | 17.8 |
| Acetylene content in the top gas TC (percent) | | 5 | 1 | | 5 | 1 |
| Top gas temperature (° C.) | | 30 | 30 | | 30 | 30 |
| Solvent temperature at TC inlet (° C.) | | 30 | 30 | | 30 | 30 |
| Gas quantity from TD to TB (nmc./h.) | | 42.3 | 43 | | 57.7 | 58.5 |
| $CO_2$ plus ethylene content in the gas from TD to TB (percent) | | 2.3 | 2.3 | | 2.5 | 2.5 |
| Gas temperature from TD to TB (° C.) | | 100 | 100 | | 100 | 100 |
| Top gas quantity of TA (nmc./h.) | 602 | 782 | 760 | 813 | 1,052 | 1,035 |
| Top gas temperature of TA (° C.) | 30 | 30 | 30 | 10 | 10 | 10 |
| Acetylene in the top gas of TA (p.p.m.) | 72 | 100 | 100 | 20 | 30 | 30 |
| $CO_2$ plus ethylene content in the acetylene produced (percent) | 0.1 | 0.1 | 0.1 | 0.2 | 0.3 | 0.3 |
| Produced acetylene (nmc./h.) | 957 | 124.3 | 124.3 | 129 | 167 | 167 | the same solvent was 10° C. In Examples I and I', the process was carried out using conventional techniques wherein the recycling or stripper gas from the primary tower 6 was fed to the crude-gas stream and entered the primary absorption chamber therewith after compression. In Examples II and II', the top gas from a secondary absorption tower using the system of FIG. 1 was recycled and combined with the crude gas stream before the compressor whereas Examples III and III' were carried out, in accordance with the present invention, with venting of the top gas from the secondary absorption tower. In the tests, the quantity of the gas treated was varied as indicated as was the acetylene content of the crude gas although other parameters were maintained as nearly constant as possible. In each case, comparing the tests II, III and II', III' with the tests I and I' respectively, it can be seen that a significant increase in the "gas volume at the primary absorption tower (TA) inlet" is obtainable.

We claim:

1. A process for the recovery of acetylene from a crude gas containing acetylene in addition to at least one contaminating component consisting of ethylene and/or carbon dioxide and comprising the steps of:
   (a) treating said crude gas in a primary absorption stage with a primary solvent in which acetylene is preferentially soluble to dissolve acetylene and at least part of said contaminating component in said solvent and recovering the solvent containing dissolved acetylene and said part of said contaminating component;
   (b) passing an acetylene-rich stripping gas in countercurrent to the solvent recovered from step (a) in a primary degassing stage to displace said part of said contaminating component from said solvent and entrain it along with said stripping gas, whereby the molar ratio of acetylene to said contaminating component varies along the path of the stripping gas passed countercurrent to the solvent;
   (c) thereafter extracting in a secondary absorption stage stripping gas from step (b) after its flow countercurrent to the primary solvent in said primary degassing stage with a secondary solvent in which acetylene is preferentially soluble to remove at least a major part of the acetylene and part of said contaminating component from said stripping gas;
   (d) removing acetylene from the primary solvent of step (b) and constituting said stripping gas from at least part of the acetylene removed from said primary solvent;
   (e) degassing the secondary solvent after the treatment of said stripping gas therewith in step (c) to produce a secondary gas mixture having a determinable molar ratio of acetylene to said contaminating component;
   (f) returning said secondary gas mixture to the primary degassing stage of step (b) at a point along said path at which said molar ratio in said secondary gas mixture is substantially equal to said molar ratio along the path of said stripping gas in said primary degassing stage; and
   (g) returning the primary solvent after removal of the acetylene therefrom in step (d) to step (a) in a substantially continuous primary solvent cycle and returning said secondary solvent from step (e) to step (c) in a secondary cycle independent of said primary cycle.

2. The process defined in claim 1 wherein said crude gas is a hydrocarbon-cracking gas mixture, the stripping gas after solvent extraction in step (c) is recycled to said primary absorption stage together with said crude gas, and a common solvent is used for both the primary and secondary stages.

References Cited

UNITED STATES PATENTS 2,719,601  10/1955  Bartholome et al. _____ 55—64
2,796,951   6/1957  Bogart _____ 55—65
2,870,867   1/1959  Bartholome et al. _____ 55—65

REUBEN FRIEDMAN, *Primary Examiner.*

C. N. HART, *Assistant Examiner.*